US011646960B2

(12) United States Patent
Bidgoli et al.

(10) Patent No.: US 11,646,960 B2
(45) Date of Patent: May 9, 2023

(54) CONTROLLER PROVIDED PROTECTION PATHS

(71) Applicant: Nokia Solutions and Networks Oy, Espoo (FI)

(72) Inventors: Hooman Bidgoli, Ottawa (CA); Andrew Stone, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/094,459

(22) Filed: Nov. 10, 2020

(65) Prior Publication Data

US 2021/0144086 A1 May 13, 2021

Related U.S. Application Data

(60) Provisional application No. 62/933,664, filed on Nov. 11, 2019.

(51) Int. Cl.
*H04L 45/28* (2022.01)
*H04L 41/0668* (2022.01)
*H04L 41/0803* (2022.01)
*H04L 45/24* (2022.01)
*H04L 47/125* (2022.01)

(52) U.S. Cl.
CPC .......... *H04L 45/28* (2013.01); *H04L 41/0668* (2013.01); *H04L 41/0803* (2013.01); *H04L 45/24* (2013.01); *H04L 47/125* (2013.01)

(58) Field of Classification Search
None
See application file for complete search history.

(56) References Cited

U.S. PATENT DOCUMENTS 10,187,305 B2   1/2019 Zhao
2003/0147344 A1*  8/2003 Stewart .................. H04L 45/00
                                              714/4.11

(Continued)

OTHER PUBLICATIONS

Voyer, D., "Segment Routing Point-to-Multipoint Policy," draft-voyer-pim-sr-p2mp-policy-00, Network Working Group, Internet-Draft, Oct. 11, 2019, 12 pages.

(Continued)

*Primary Examiner* — Christine T Duong
(74) *Attorney, Agent, or Firm* — Tong, Rea, Bentley & Kim, LLC

(57) ABSTRACT

Various example embodiments for supporting packet routing in a communication system may be configured to, in a communication network, support use of primary routing paths for routing traffic in the communication network and use of controller provided protection paths configured to protect the primary paths based on rerouting of traffic around failures in the communication network. Various example embodiments for supporting packet routing in a communication system may be configured to support controller provided protection paths in a communication network based on use of path control capabilities in which a network controller computes paths for a network and configures the paths in the network based on configuration of the paths on nodes of the network and based on routing capabilities in which the nodes use the routing paths for routing of traffic (e.g., via primary paths) and rerouting of traffic (e.g., via controller provided protection paths).

16 Claims, 5 Drawing Sheets

(56) References Cited

U.S. PATENT DOCUMENTS

| | | |
|---|---|---|
| 2015/0103844 A1 | 4/2015 | Zhao |
| 2016/0006609 A1* | 1/2016 | Zhao ................... H04L 41/0816 |
| | | 370/254 |
| 2016/0173366 A1* | 6/2016 | Saad ....................... H04L 45/20 |
| | | 370/389 |
| 2020/0127913 A1* | 4/2020 | Filsfils ................... H04L 45/50 |

OTHER PUBLICATIONS

Voyer, D., "SR Replication Segment for Multi-point Service Delivery," draft-voyer-spring-sr-replication-segment-00, Network Working Group, Internet-Draft, Oct. 11, 2019, 6 pages.

Sivabalan, S., "Carrying Binding Label/Segment-ID in PCE-based Networks," draft-sivabalan-pce-binding-label-SID-07, PCE Working Group, Internet-Draft, Jul. 8, 2019, 16 pages.

Bidgoli, H., et al., "PCEP extensions for p2mp sr policy," draft-hsd-pce-sr-p2mp-policy-01, Network Working Group, Internet Draft, Nov. 2, 2019, 35 pages.

Bidgoli, H., et al., "Advertising p2mp policies in BGP," draft-hb-idr-sr-p2mp-policy-00, Network Working Group, Internet Draft, Oct. 28, 2019, 15 pages.

Filsfils, C., et al., "Segment Routing Architecture," Internet Engineering Task Force, IETF, RFC 8402, Jul. 2018, 32 pages.

EP Extended Search Report mailed in corresponding EP 20205543.0 dated Feb. 18, 2021, 10 pages.

EP Action mailed in corresponding EP 20 205 543.0 dated Feb. 13, 2023, 6 pages.

\* cited by examiner

CONTROLLER PROVIDED PROTECTION PATHS

CROSS REFERENCE TO RELATED APPLICATIONS

This application claims the benefit of U.S. Provisional Patent Application Ser. No. 62/933,664, filed on Nov. 11, 2019, entitled CONTROLLER PROVIDED PROTECTION PATHS, which is hereby incorporated herein by reference in its entirety.

TECHNICAL FIELD

Various example embodiments relate generally to communication systems and, more particularly but not exclusively, to supporting use of protection paths for improved reliability in communication systems.

BACKGROUND

Communication systems may use various types of packet routing (e.g., destination-based routing, source routing, or the like) to support communication of various types of information over various types of underlying communication networks.

SUMMARY

In at least some example embodiments, an apparatus includes at least one processor and at least one memory including program code, wherein the at least one memory and the program code are configured to, with the at least one processor, cause the apparatus to at least compute, by a network controller for a primary path of a network, a protection path configured to protect a portion of the primary path and send, by the network controller toward the network, protection path configuration information for the protection path. In at least some example embodiments, a non-transitory computer-readable medium stores instructions which, when executed by an apparatus, cause the apparatus to at least compute, by a network controller for a primary path of a network, a protection path configured to protect a portion of the primary path and send, by the network controller toward the network, protection path configuration information for the protection path. In at least some example embodiments, a method includes computing, by a network controller for a primary path of a network, a protection path configured to protect a portion of the primary path and sending, by the network controller toward the network, protection path configuration information for the protection path. In at least some example embodiments, an apparatus includes means for computing, by a network controller for a primary path of a network, a protection path configured to protect a portion of the primary path and means for sending, by the network controller toward the network, protection path configuration information for the protection path. In at least some example embodiments, the primary path comprises a unicast path based on segment routing, a point-to-multipoint multicast path, or a point-to-multipoint multicast path based on segment routing. In at least some example embodiments, the protection path comprises a traffic engineered path computed based on traffic engineering information. In at least some example embodiments, the portion of the primary path comprises at least one of a link, a node, or a segment. In at least some example embodiments, the primary path comprises a unicast path based on segment routing. In at least some example embodiments, the protection path is computed for an identifier that is configured to represent the portion of the primary path. In at least some example embodiments, the identifier is associated with a first node of the primary path that is able to resolve the identifier to identify a sequence of hops of the portion of the primary path, and the protection path is computed based on a determination that a second node of the primary path that is upstream of the first node of the primary path is unable to resolve the identifier to identify the sequence of hops of the portion of the primary path. In at least some example embodiments, the protection path configuration information is provided to the second node of the primary path. In at least some example embodiments, the protection path configuration information comprises a description of the protection path and a mapping of the protection path to the identifier. In at least some example embodiments, the identifier comprises a Binding Segment Identifier (BSID). In at least some example embodiments, the primary path comprises a multicast path without segment routing. In at least some example embodiments, the protection path comprises a sequence of hops, and the protection path configuration information comprises, for each of the hops of the protection path, a backup replication segment. In at least some example embodiments, a source of the protection path is a node of the primary path, the node includes a replication segment for the primary path, and the protection path configuration information comprises a backup replication segment for the protection path and an instruction to modify the replication segment for the primary path to point to the backup replication segment.

In at least some example embodiments, an apparatus includes at least one processor and at least one memory including program code, wherein the at least one memory and the program code are configured to, with the at least one processor, cause the apparatus to at least receive, by a node from a network controller, protection path configuration information for a protection path configured to protect a portion of a primary path and support, by the node based on the protection path configuration information, rerouting of packets of the primary path via the protection path. In at least some example embodiments, a non-transitory computer-readable medium stores instructions which, when executed by an apparatus, cause the apparatus to at least receive, by a node from a network controller, protection path configuration information for a protection path configured to protect a portion of a primary path and support, by the node based on the protection path configuration information, rerouting of packets of the primary path via the protection path. In at least some example embodiments, a method includes receiving, by a node from a network controller, protection path configuration information for a protection path configured to protect a portion of a primary path and supporting, by the node based on the protection path configuration information, rerouting of packets of the primary path via the protection path. In at least some example embodiments, an apparatus includes means for receiving, by a node from a network controller, protection path configuration information for a protection path configured to protect a portion of a primary path and means for supporting, by the node based on the protection path configuration information, rerouting of packets of the primary path via the protection path. In at least some example embodiments, the primary path comprises a unicast path based on segment routing, a point-to-multipoint multicast path, or a point-to-multipoint multicast path based on segment routing. In at least some example embodiments, the protection path comprises a traffic engineered path computed based on traffic engineering information. In at least some example embodiments, the portion of the primary path comprises at least one of a link, a node, or a segment. In at least some example embodiments, the primary path comprises a unicast path based on segment routing. In at least some example embodiments, the protection path is associated with an identifier that is configured to represent the portion of the primary path. In at least some example embodiments, the identifier is associated with second node of the primary path that is able to resolve the identifier to identify a sequence of hops of the portion of the primary path, and the node is upstream of the second node and is unable to resolve the identifier to identify the sequence of hops of the portion of the primary path. In at least some example embodiments, the protection path configuration information comprises a description of the protection path and a mapping of the protection path to the identifier. In at least some example embodiments, the identifier comprises a Binding Segment Identifier (BSID). In at least some example embodiments, the node receives a packet associated with the primary path and including a source route, the node identifies based on the source route that a next hop of the primary path is a downstream node of the primary path, the node identifies the identifier from the source route based on a determination that the downstream node of the primary path is not reachable via the primary path, and the node reroutes the packet via the protection path based on the identifier. In at least some example embodiments, the primary path comprises a multicast path without segment routing. In at least some example embodiments, the node is a head node of the portion of the primary path and a head node of the protection path, the node includes a replication segment for the primary path, and the protection path configuration information comprises a backup replication segment for the protection path and an instruction to modify the replication segment for the primary path to point to the backup replication segment. In at least some example embodiments, the node is a transit node of the protection path or a terminating node of the protection path, and the protection path configuration information comprises a backup replication segment for the protection path.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
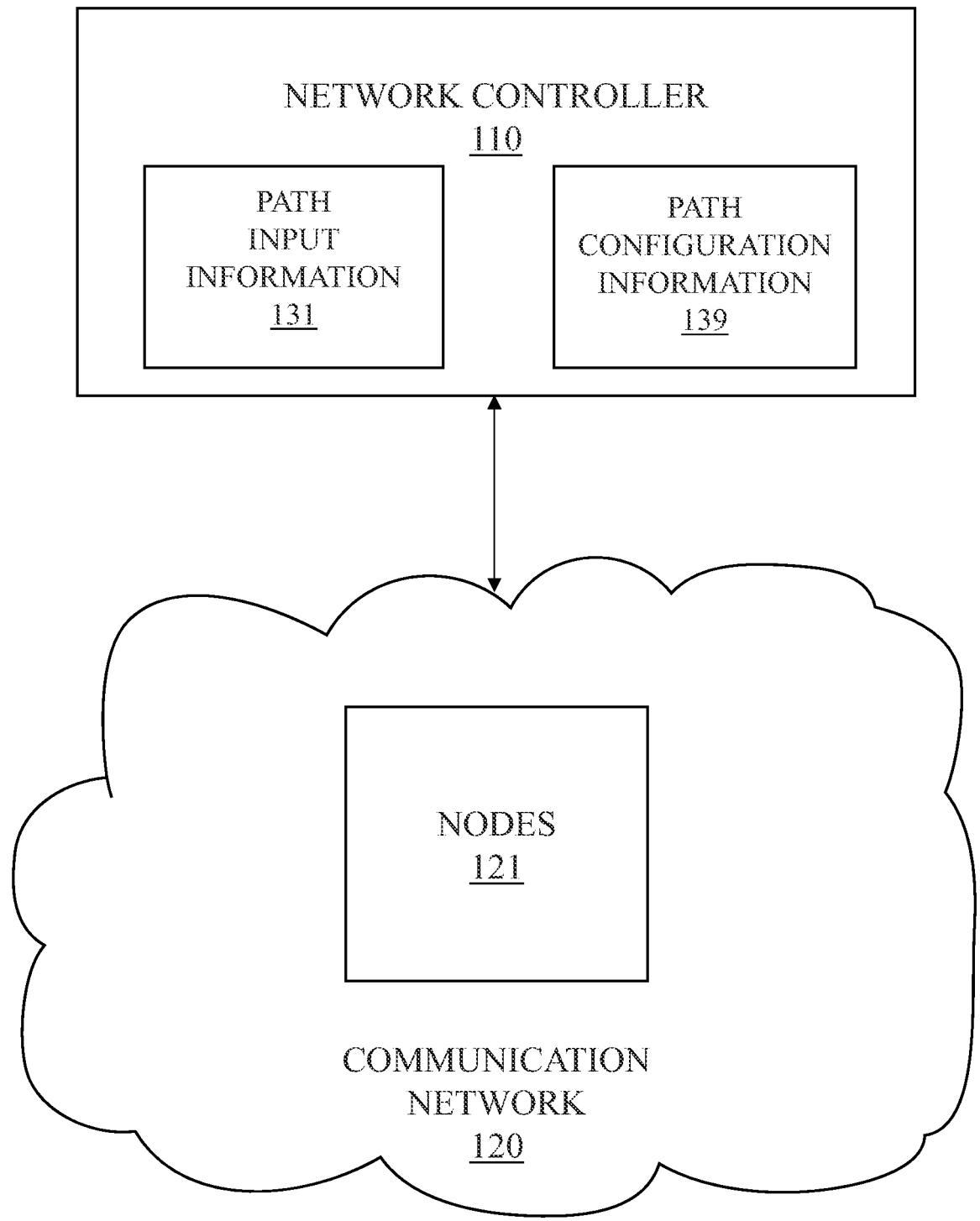
FIG. 1 depicts an example embodiment of a communication system configured to support controller provided protection paths in a communication network.

Various example embodiments for supporting packet routing in communication systems are presented. Various example embodiments for supporting packet routing in a communication system may be configured to, in a communication network, support use of primary routing paths for routing traffic in the communication network and use of controller provided protection paths configured to protect the primary paths (e.g., a given controller provided protection path may protect all or part of a primary path for which the controller provided protection path is provided) based on rerouting of traffic around failures in the communication network. Various example embodiments for supporting packet routing in a communication system may be configured to support controller provided protection paths in a communication network based on use of path control capabilities in which a network controller computes paths for a network and configures the paths in the network based on configuration of the paths on nodes of the network and based on routing capabilities in which the nodes use the routing paths for routing of traffic (e.g., via primary paths) and rerouting of traffic (e.g., via controller provided protection paths). Various example embodiments for supporting packet routing in communication systems may be configured to support controller provided protection paths in a communication network based on a network controller being configured to compute a protection path configured to protect a portion of a primary path of a network and being configured to send, toward the network, protection path configuration information for the protection path. Various example embodiments for supporting packet routing in communication systems may be configured to support controller provided protection paths in a communication network based on a node being configured to receive, from a network controller, protection path configuration information for a protection path configured to protect a portion of a primary path and being configured to support, based on the protection path configuration information, rerouting of packets of the primary path via the protection path.

It will be appreciated that the types of routing paths for which primary paths and associated controller provided protection paths may be supported may include various types of routing paths. Various example embodiments for supporting packet routing in communication systems may be configured to support controller provided protection paths in a communication network using source routing, where the source routing may include Internet Protocol (IP) based source routing, Segment Routing (SR), and the like. Various example embodiments for supporting packet routing in communication systems may be configured to support controller provided protection paths in a communication network for unicast paths (e.g., based on an SR Policy or the like). Various example embodiments for supporting packet routing in communication systems may be configured to support controller provided protection paths in a communication network for multicast paths (e.g., based on Replication P2MP Policy, based on SR Replication P2MP Policy, or the like). It will be appreciated that primary paths and associated controller provided protection paths may be supported for various other types of routing paths.

It will be appreciated that the network controller which is configured to compute and configure controller provided protection paths in a communication network and the nodes which are configured to support controller provided protection paths in a communication network may be implemented in various ways (e.g., based on use of a Path Computation Element Protocol (PCEP) for control communications where the network controller is a Path Computation Element (PCE) and the nodes are Path Computation Clients (PCCs), based on use of Border Gateway Protocol (BGP)—Segment Routing—Traffic Engineering (SR-TE), based on use of BGP Point-to-Multipoint (P2MP) SR-TE, based on use of Network Configuration Protocol (NCP)/Yet Another Next Generation (NETCONF/YANG), or the like); however, for purposes of clarity, various example embodiments for supporting controller provided protection paths in a communication network are primary presented herein with respect to examples in which the network controller and the nodes operate as a PCE and PCCs, respectively, that communicate based on PCEP.

It will be appreciated that these and various other example embodiments and advantages or potential advantages of supporting packet routing in communication systems based on use of controller provided protection paths may be further understood by way of reference to the various figures, which are discussed further below.

FIG. 1 depicts an example embodiment of a communication system configured to support controller provided protection paths in a communication network.

The communication system 100 may be configured to support use of primary routing paths for routing traffic in the communication network and use of protection paths configured to protect the primary paths (e.g., a given protection path may protect all or part of a primary path for which the protection path is provided) based on rerouting of traffic around failures in the communication network. The protection paths may be configured to protect various elements against various types of failures which may impact primary paths (e.g., link protection, node protection, segment protection, or the like, as well as various combinations thereof). The protection paths may be used to support fast reroute (FRR) operations in response to detection of failures on primary paths protected by the protection paths. The protection paths used to protect primary paths may be traffic engineered protection paths. The protection paths used to protect primary paths may be provided by a network controller configured to control configuration of network nodes to support the primary paths and the protection paths for the primary paths and, therefore, may be referred to herein as controller provided protection paths configured to protect primary paths. The operation of the communication system 100 in supporting use of controller provided protection paths to protect primary paths is discussed further below.

The communication system 100 may be configured to support use of controller provided protection paths to protect primary paths for various types of primary paths. The communication system 100 may be configured to support use of controller provided protection paths to protect primary paths for various types of primary paths, such as for various types of source routed paths (e.g., source routed paths without use of SR, source routed paths based on SR (which may be referred to as segment routed paths) or the like). The communication system 100 may be configured to support use of controller provided protection paths to protect primary paths for various types of primary paths, such as for unicast paths based on SR (e.g., based on an SR Policy, where such paths may be referred to as SR policy paths, an example of which is presented with respect to FIG. 2), multicast paths without use of SR (e.g., based on a Replication P2MP Policy, where such paths may be referred to as replication P2MP policy paths, an example of which is presented with respect to FIG. 3), multicast paths based on SR (e.g., based on an SR Replication P2MP Policy, where such paths may be referred to as SR replication P2MP policy paths), or the like. The communication system 100 may be configured to support use of controller provided protection paths to protect primary paths for various other types of primary paths.

The communication system 100 may be configured to support use of controller provided protection paths to protect primary paths based on use of a network controller 110 and a communication network 120 including nodes 121. The network controller 110 is configured to provide paths for conveying data within the communication network 120, where providing the paths may include computing the paths for the communication network 120 and configuring the paths within the communication network 120. The network controller 110 may compute the paths for the communication network 120 based on path input information 131. The network controller 110 may configure the computed paths within the communication network 120 by configuring the nodes 121 of the communication network 120 to support the paths. The network controller 110 may configure the nodes 121 of the communication network 120 to support the paths by sending path configuration information 139 to the nodes 121. The nodes 121 may perform packet forwarding functions within the communication network 120 using the paths configured by the network controller 110. The nodes 121 may perform packet forwarding functions (which may include forwarding without replication, forwarding based on replication, or the like) within the communication network 120 using the path configuration information 139 received from the network controller 110. It will be appreciated that the path input information 131 and the path configuration information 139 may vary for different types of paths (e.g., for paths based on different technologies, for unicast paths versus multicast paths, for primary paths versus protection paths, or the like, as well as various combinations thereof). The network controller 110 may be a management system, a network node, or other entity. The nodes 121 may be network nodes such as routers or other types of network nodes. It will be appreciated that the network controller 110 and the nodes 121 may be implemented based on various technologies which may be used to support communications between the network controller 110 and the nodes 121 (e.g., network controller 110 may be a PCE and nodes 121 may be PCCs where communication is based on PCEP, communication may be based on BGP SR-TE, communication may be based on BGP P2MP SR-TE, communication may be based on NETCONF/YANG, or the like).

The network controller 110 is configured to compute a primary routing path and to configure the communication network 120 to support use of the primary routing path. The primary routing path, as indicated above, may be a unicast path (e.g., based on SR Policy, as example of which is presented in FIG. 2), a multicast path without use of SR (e.g., based on Replication P2MP Policy, an example of which is presented in FIG. 3), a multicast path based on SR (e.g., based on SR Replication P2MP Policy), or the like. The primary routing path identifies path resources, such as nodes and links, based on identifying criteria of the path resources (e.g., a list of labels, a list of SIDs, a list of IP addresses, or the like).

The network controller 110 may compute the primary routing path based on the path input information 131 which, for the primary routing path, may include topology information, traffic engineering information (e.g., hop lists (e.g., explicit hops, hops to be avoided, or the like), constraints (e.g., policy constraints, price constraints, quality-of-service (QoS) constraints, telemetry information (e.g., live telemetry bandwidth utilization, telemetry latency measurements, or the like), controller-specific constraints, or the like), or the like), or the like, as well as various combinations thereof. The network controller 110 may compute the primary routing path responsive to a request from the communication network 120 (e.g., a request from one of the nodes 121 or other element(s) of the communication network 120), responsive to a request from a user (e.g., initiated via one or more user interfaces of the network controller 110, one or more user interfaces of one or more management systems which may be configured to interface with the network controller 110, or the like), or the like.

The network controller 110 may configure the communication network 120 to support use of the primary routing path by sending path configuration information 139 for the primary routing path to the communication network 120. The network controller 110 may configure the communication network 120 to support use of the primary routing path by sending the path configuration information 139 to one or more nodes 121 of the communication network 120 which form part of the primary routing path.

The nodes 121 may be configured to support configuration of the communication network 120 by the network controller 110 to support the primary routing path and to support forwarding of traffic within the communication network 120 using the primary routing path. The nodes 121 may be configured to receive the path configuration information 139 for the primary routing path, store the path configuration information 139 for the primary routing path, perform one or more configuration actions based on the path configuration information 139 for the primary routing path (e.g., the nodes 121 may configure themselves, based on the path configuration information 139, to support the primary routing path), and support forwarding of traffic via the primary routing path based on the path configuration information 139 for the primary routing path.

It will be appreciated that, for the primary routing path, the path configuration information 139 that is determined and sent by network controller 110 and received and used by the nodes 121 may vary under various conditions. For example, for the primary routing path, the path configuration information 139 may include a source route for use by the head node of the primary routing path (e.g., where SR Policy is used), replication segments (RSs) and forwarding information (e.g., where SR Replication Policy is used), or the like, as well as various combinations thereof. It will may be appreciated that the path configuration information 139 may include routes, mappings, rules, instructions, or the like, as well as various combinations thereof.

The network controller 110 may be configured to support various other functions for computing the primary routing path and configuring the communication network 120 to support use of the primary routing path and, similarly, the nodes 121 may be configured to support various other functions for supporting forwarding of traffic using the primary routing path.

The network controller 110 is configured to compute a controller provided protection path configured to protect a portion of the primary routing path and to configure the communication network 120 to support use of the controller provided protection path to protect the portion of the primary routing path. The controller provided protection path may be configured to provide link protection, node protection, segment protection, or the like, as well as various combinations thereof. The controller provided protection path may be configured to protect a portion of a unicast path (e.g., based on SR Policy, as example of which is presented in FIG. 2), may be configured to protect a portion of a multicast path (e.g., based on Replication P2MP Policy, an example of which is presented in FIG. 3), or the like. The controller provided protection path identifies path resources, such as nodes and links, based on identifying criteria of the path resources (e.g., a list of labels, a list of SIDs, a list of IP addresses, or the like).

The network controller 110 may compute the controller provided protection path based on the path input information 131 which, for the controller provided protection path, may include topology information, traffic engineering information (e.g., hop lists (e.g., explicit hops, hops to be avoided, or the like), constraints (e.g., policy constraints, price constraints, quality-of-service (QoS) constraints, telemetry information (e.g., live telemetry bandwidth utilization, telemetry latency measurements, or the like), controller-specific constraints, or the like), or the like), or the like, as well as various combinations thereof. It will be appreciated that the traffic engineering information may include various types of information which are available to the network controller 110 but which generally are not available to the nodes 121 (e.g., for SR, routers generally do not know the bandwidth utilization of links and, thus, would be unable to calculate a protection path that is based on the bandwidth utilization of the links) and, thus, which otherwise may not be used if the protection paths instead were computed locally by the nodes 121 using other protection mechanisms which generally result in shortest path, best effort protection paths (e.g., using Loop-Free Alternate (LFA) Fast Reroute (FRR) mechanisms, Topology Independent (TI) LFA (TI LFA) FRR mechanisms, and the like). It will be appreciated that, where traffic engineering information is used to compute the controller provided protection path, the controller provided protection path also may be referred to as a traffic engineered protection path. The network controller 110 may compute the controller provided protection path responsive to a request from the communication network 120 (e.g., a request from one of the nodes 121 or other element(s) of the communication network 120), responsive to a request from a user (e.g., initiated via one or more user interfaces of the network controller 110, one or more user interfaces of one or more management systems which may be configured to interface with the network controller 110, or the like), based on detection of a condition or event by the network controller 110, or the like.

The network controller 110 may configure the communication network 120 to support use of the controller provided protection path by sending path configuration information 139 for the controller provided protection path to one or more nodes 121 of the communication 120 (e.g., one or more nodes 121 which form part of the primary routing path protected by the controller provided protection path, one or more nodes 121 which form part of the controller provided protection path, or the like, as well as various combinations thereof).

The nodes 121 may be configured to support configuration of the communication network 120 by the network controller 110 to support the controller provided protection path and to support rerouting of traffic of the primary routing path using the controller provided protection path. The nodes 121 may be configured to receive the path configuration information 139 for the controller provided protection path, store the path configuration information 139 for the controller provided protection path, perform one or more configuration actions based on the path configuration information 139 for the controller provided protection path (e.g., the nodes 121 may configure themselves, based on the path configuration information 139, to support the controller provided protection path), and rerouting of traffic of the primary routing path using the controller provided protection path based on the path configuration information 139 for the controller provided protection path. It will be appreciated that the rerouting of traffic of the primary routing path using the controller provided protection path, based on detection of a failure in the primary routing path, may be considered to be a fast reroute (FRR) operation.

It will be appreciated that, for the controller provided protection path, the path configuration information 139 that is determined and sent by network controller 110 and received and used by the nodes 121 may vary under various conditions. For example, for the controller provided protection path, the path configuration information 139 may include a source route for use by the head node of the controller provided protection path (e.g., where SR Policy is used), mappings of BSIDs to protection path routes for controller provided protection paths (e.g., where SR Policy is used), backup replication segments (BRSs) and forwarding information (e.g., where SR Replication Policy is used), or the like, as well as various combinations thereof. It will may be appreciated that the path configuration information 139 may include routes, mappings, rules, instructions, or the like, as well as various combinations thereof.

The network controller 110 may be configured to support various other functions for computing the controller provided protection path and configuring the communication network 120 to support use of the controller provided protection path to protect the portion of the primary routing path and, similarly, the nodes 121 may be configured to support various other functions for supporting forwarding of traffic via the controller provided protection path based on detection of a failure associated with the primary routing path.

The network controller 110 may be configured to support various other functions for computing the controller provided protection path configured to protect the primary routing path and configuring the communication network 120 to support use of controller provided protection path to protect the primary routing path.

It will be appreciated that, although primarily presented herein with respect to example embodiments in which a single controller provided protection path is used to protect a given primary path (e.g., for protecting all or part of the primary path), in at least some example embodiments multiple controller provided protection paths may be used to protect a given primary path (e.g., one or more non-overlapping protection paths protecting respective portions of the primary path, one or more overlapping protection paths protecting respective portions of the primary path, or the like, as well as various combinations thereof. As such, any given portion of a primary path (e.g., a single link, a single node, a single segment, multiple links, multiple nodes, multiple segments, or the like) may be protected by one or more controller provided protection paths in various arrangements.

It will be appreciated that the system 100 may be configured to support various other functions for supporting use of controller provided protection paths to protect primary routing paths.

Figure 2:
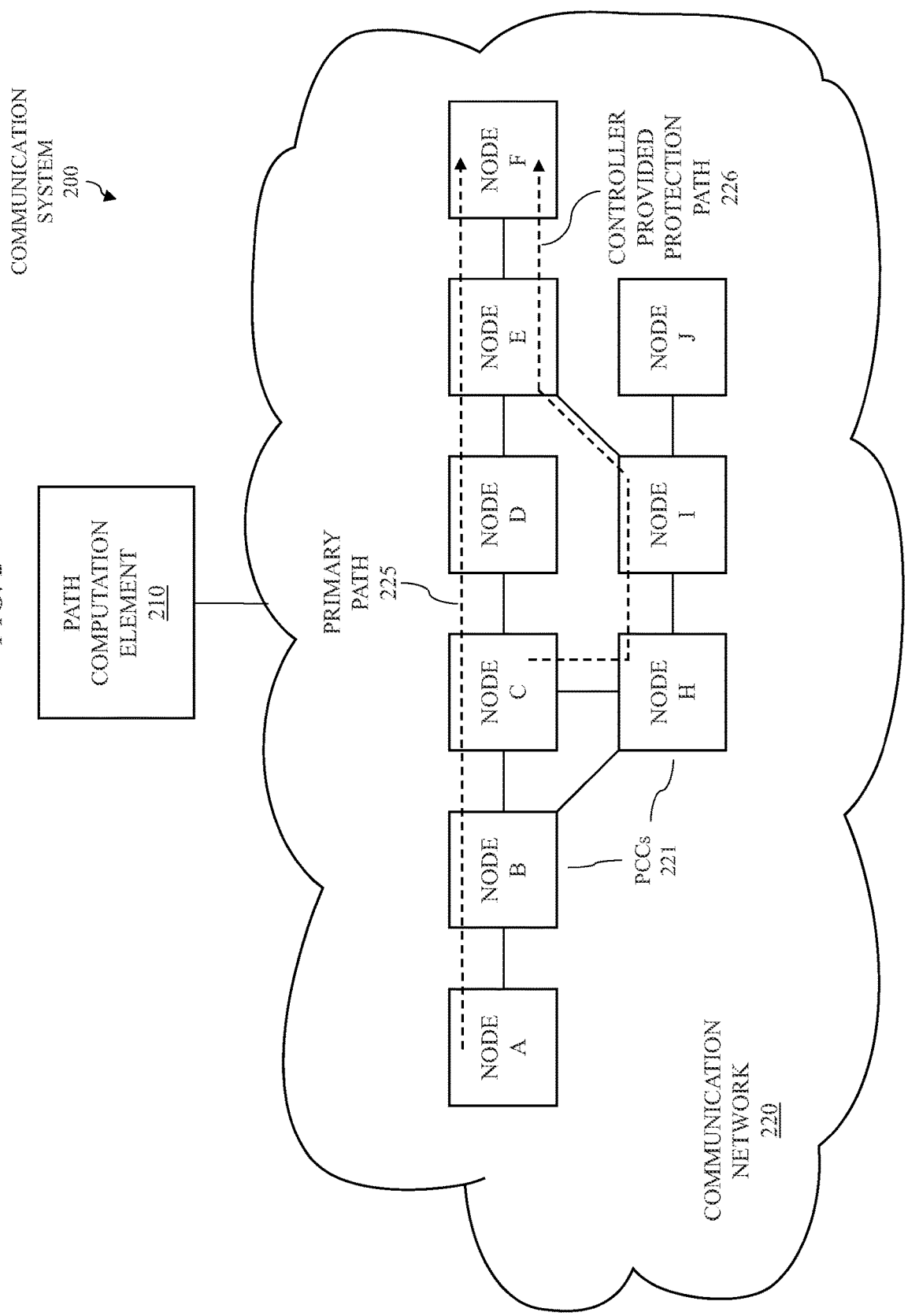
FIG. 2 depicts an example embodiment of a communication system configured to support controller provided protection paths in a communication network using paths based on a Segment Routing (SR) Policy framework.

FIG. 2 depicts an example embodiment of a communication system configured to support controller provided protection paths in a communication network using paths based on an SR Policy framework.

The communication system 200, as indicated above, is configured to use unicast routing, using segment routing (SR), based on the SR Policy framework. In RFC 8402, SR introduced the concept of a Binding Segment Identifier (BSID). As described in RFC 8402, a BSID allows a single SID to be associated with an underlying path (list of SIDs) and, when a router receives a label matching a known binding SID, the label is replaced with a stack of labels for the underlying path. The BSIDs are known to the PCE since the BSID is associated with an SR Policy path and is reported to the PCE (e.g., as described in draft-sivabalan-pce-binding-label-sid), but are not known to nodes in the network (other than nodes specifically configured to resolve these BSIDs in path expansion operations) since the BSIDs are not advertised in IGP. For example, if a headend router of a path is configured (e.g., either manually or via PCE) to forward traffic with a BSID in the label stack, that headend router is completely unaware of the underlying path represented by the BSID and, thus, is unaware of the router on which the BSID path terminates. Similarly, for example, if a transit router of a path receives a label stack including a BSID but is not the headend router for that BSID, then that transit router is completely unaware of the underlying path represented by the BSID and, thus, is unaware of the router on which the BSID path terminates. Accordingly, in at least some example embodiments, controller provided protection paths (e.g., associated with BSIDs) may be used to provide various types of protection (e.g., link protection, node protection, segment protection, or the like, as well as various combinations thereof) within the context of communication networks using SR Policy.

The communication system 200 includes a path computation element (PCE) 210 and a communication network 220 including nine path computation clients (PCCs) 221 (denoted as nodes A, B, C, D, E, F, H, I, and J for purposes of simplicity in describing paths within the communication network 220). It will be appreciated that the PCE 210 and the PCCs 221 of FIG. 2 may be configured to operate in a manner similar to the network controller 110 and the nodes 121 of FIG. 1, respectively.

In FIG. 2, the communication network 220 is configured such that node A is connected to node B, node B is connected to nodes C and H, node C is connected to nodes B, D, and H, node D is connected to nodes C and E, node E is connected to nodes D, F, I, and J, node F is connected to node E, node H is connected to nodes B, C, and I, node I is connected to nodes E, H, and J, and node J is connected to nodes E and I.

In FIG. 2, a primary path 225 has been computed by PCE 210 and configured within the communication network 220 by the PCE 210. The primary path 225 is a segment routed path. The primary path 225 is a unicast path. The primary path 225 includes nodes A, B, C, D, E, and F (i.e., node A is the source of the primary path 225 and node F is the destination of the primary path 225). The primary path 225 is specified as a source route [B, C, 1000], where "B" is a label identifying node B of the primary path 225, "C" is a label identifying node C of the primary path 225, and "1000" is a BSID representing the portion of the primary path 225 that includes nodes C, D, E, and F. The primary path 225 has been configured within communication network 220 by configuring certain PCCs 221 of the primary path 225 with protection path configuration information. Namely, the primary path 225 has been configured within communication network 220 by configuring node A to use the primary path 225 to reach destination node F (e.g., node A is configured with packet forwarding information such that node A, for packets to be transmitted on the primary path 225, adds the source route [B, C, 1000] to headers of the packets) and configuring node C with a mapping of the BSID "1000" to the portion of the primary path 225 that includes nodes C, D, E, and F (e.g., node C is configured with packet forwarding information such that node C, upon receiving packets with a source route including the BSID "1000", can recognize the BSID "1000" and perform source route expansion for the packet by replacing the BSID "1000" with labels indicative of nodes D, E, and F included in the portion of the primary path 225 represented by the BSID "1000").

In FIG. 2, a controller provided protection path 226 has been computed by PCE 210 and configured within the communication network 220 by the PCE 210.

The controller provided protection path 226 may be computed by PCE 210 and configured within the communication network 220 by the PCE 210 based on identification by the PCE 210 of use of the BSID "1000" in the primary path 225 and a determination by the PCE 210 that the path [D, E, F] of BSID "1000" needs to be protected for the primary path 225. The PCE 210 is able to determine that the path D-E-F of BSID "1000" needs to be protected for the primary path based on a determination that node B of the primary path 225 is unaware of BSID "1000" and, thus, unable to resolve BSID "1000" into its path D-E-F in the event of a failure of node C of the primary path 225 (i.e., that the path D-E-F of BSID "1000" needs to be protected at node B in the event of a failure of node C). The PCE 210 is able to make the determination that node B of the primary path 225 is unaware of BSID "1000" and thus, unable to resolve BSID "1000" into its path D-E-F in the event of a failure of node C of the primary path 225 since PCE 210 is aware of the primary path 225 (and, thus, is aware that nodes B and are both used as transit nodes for the primary path 225), is aware of use of the BSID "1000" within the primary path 225 for encoding a portion of the primary path 225, and is aware that, since the hop after node B in the primary path 225 is a BSID, node B will be unable to calculate a protection path in the event of a failure of node C (i.e., unable to resolve a protection path for BSID "1000").

The controller provided protection path 226 is configured to protect the path represented by the BSID "1000" (i.e., the portion of the primary path 225 indicated by BSID "1000" which, as previously indicated, is the path D-E-F). The controller provided protection path 226 computed by the PCE 210 is computed from node B (the source of the controller provided protection path 226) to node F (the destination of the path D-E-F of BSID "1000" that is to be protected). The controller provided protection path 226 computed by the PCE 210, as illustrated in FIG. 2, is the path H-I-E-F (i.e., when node B detects a failure of node C, node B will route packets toward node H such that the packets are routed via the controller provided protection path 226).

The controller provided protection path 226 is configured within the communication network 220. The controller provided protection path 226 may be configured within the communication network 220 by configuring node B so that node B can use the controller provided protection path 226 to route packets around a failure of node C (since only node C of the primary path 225 is configured to resolve BSID "1000" and node B is unaware of BSID "1000" and thus, unable to resolve BSID "1000" into its path D-E-F). The controller provided protection path 226 computed by PCE 210 may be configured on node B by downloading to node B an instruction that the controller provided protection path 226 for label "1000" is H-I-E-F. The controller provided protection path 226 computed by PCE 210 may be configured on node B by programming node B with the segment list of the controller provided protection path 226 and configuring the segment list of the segment routing path 225 to recognize the controller provided protection path 226.

The controller provided protection path 226 is used within the communication network 220 to protect the path represented by BSID "1000" (i.e., the portion of the primary path 225 indicated by BSID "1000" which, as previously indicated, is the path D-E-F). The controller provided protection path 226 is used within the communication network to route packets around a failure of node C. The node B, based upon detection of a failure of node C, will reroute packets from the primary path 225 to the controller provided protection path 226 such that the packets are routed along the path H-I-E-F rather than the path C-D-E-F. The node B may reroute packets from the primary path 225 to the controller provided protection path 226 by removing the primary path source route (e.g., [B, C, 1000]) of the primary path 225 from the headers of the packets and replacing the primary path source route with the protection path source route (e.g., [H, I, E, F]) of the controller provided protection path 226. It will be appreciated that computation and configuration of the controller provided protection path 226 enables traffic to continue to be forwarded when it otherwise might not have been due to an inability of node B to resolve BSID "1000" into its path D-E-F in the event of a failure of node C of the primary path 225.

It will be appreciated that, although primarily presented herein with respect to example embodiments in which controller provided protection paths are computed and configured only for neighboring PCCs 221 of a PCC 221 which may require such controller provided protection paths (e.g., based on primary paths, and associated BSIDs, of which the PCE 210 is aware), in at least some example embodiments controller provided protection paths may be computed and configured for all neighboring PCCs 221 of a PCC 221 (e.g., to blindly protect all primary paths originating from that PCC 221, including primary paths of which the PCE 210 may not be aware).

It will be appreciated that the PCE 210 and PCCs 221 may be configured to support various other functions for supporting use of controller provided protection paths within the context of unicast paths based on the SR Policy framework.

It will be appreciated that, although primarily presented herein with respect to example embodiments in which a specific type of identifier is used to identify a sequence of segments (namely, a BSID as described in RFC 8402), in at least some example embodiments support for use of controller provided protection paths to protect unicast paths may be based on use of other types of identifiers which may be used to identify a sequence of segments (e.g., other types of BSIDs, other types of SIDs, other types of identifiers, or the like).

Figure 3:
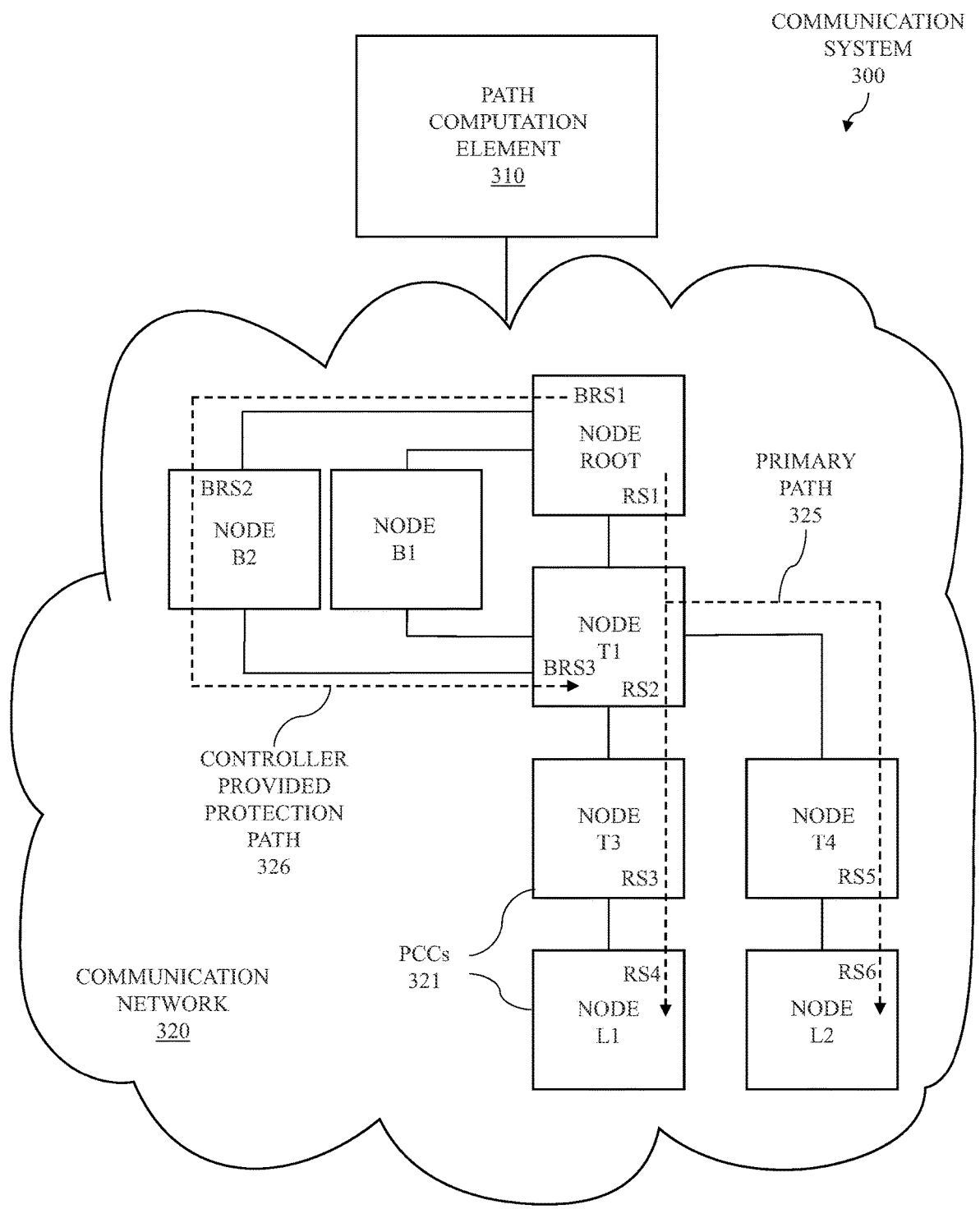
FIG. 3 depicts an example embodiment of a communication system configured to support controller provided protection paths in a communication network using paths based on a Replication P2MP Policy framework.

FIG. 3 depicts an example embodiment of a communication system configured to support controller provided protection paths in a communication network using paths based on the Replication P2MP Policy framework.

The communication system 300, as indicated above, is configured to use multicast routing, without using SR, based on the Replication P2MP Policy framework. It will be appreciated that versions of the Replication P2MP Policy are described in [draft-voyer-pim-sr-p2mp-policy] and [draft-voyer-spring-sr-replication-policy]. In the Replication P2MP Policy as defined in these drafts, a P2MP tree can be built in an IGP domain that is not part of an SR domain (i.e., the IGP domain does not advertise segment routing extensions and, thus, SR LFA and TI LFA cannot be used for link protection since these LFAs need an SR extension to build the MPLS path). Accordingly, in at least some example embodiments, controller provided protection paths (e.g., based on use of replication segments) may be used to provide various types of protection (e.g., link protection, node protection, segment protection, or the like, as well as various combinations thereof) within the context of communication networks using multicast paths based on the Replication P2MP Policy.

The communication system 300 includes a path computation element (PCE) 310 and a communication network 320 including eight path computation clients (PCCs) 321 (denoted as nodes ROOT, T1, T3, T4, L1, L2, B1, and B2 for purposes of simplicity in describing paths within the communication network 320). It will be appreciated that the PCE 310 and the PCCs 321 of FIG. 3 may be configured to operate in a manner similar to the network controller 110 and the nodes 121 of FIG. 1, respectively.

In FIG. 3, the communication network 320 is configured such that node ROOT is connected to nodes T1, B1, and B2, node T1 is connected to nodes ROOT, T3, T4, B1, and B2, node T3 is connected to nodes T1 and L1, node T4 is connected to nodes T1 and L2, node L1 is connected to node T3, node L2 is connected to node T4, node B1 is connected to nodes ROOT and T1, and node B2 is connected to nodes ROOT and T1. Here, it will be appreciated that "T" (e.g., in T1, T3, and T4) refers to "transit" nodes, "L" (e.g., in L1 and L2) refers to "leaf" nodes, and "B" (e.g., in B1 and B2) refers to "bypass" nodes.

In FIG. 3, a primary path 325 has been computed by PCE 310 and configured within the communication network 320 by the PCE 310. The primary path 325 is a P2MP tree rooted at the node ROOT. The primary path 325 includes nodes ROOT, T1, T3, T4, L1, and L2 (i.e., node ROOT is the source of the primary path 325 and the nodes L1 and L2 are the destinations of the primary path 325). The primary path 325 has been configured within communication network 320 by configuring each of the nodes of the primary path 325 with protection path configuration information including replication segments (RS) and associated packet forwarding information. Namely, the primary path 325 has been configured within the communication network 320 by configuring node ROOT with a replication segment RS1 and packet forwarding information, configuring node T1 with a replication segment RS2 and packet forwarding information, configuring node T3 with a replication segment RS3 and packet forwarding information, configuring node L1 with a replication segment RS4 and packet forwarding information, configuring node T4 with a replication segment RS5 and packet forwarding information, and configuring node L2 with a replication segment RS6 and packet forwarding information.

In FIG. 3, a controller provided protection path 326 has been computed by PCE 310 and configured within the communication network 320 by the PCE 310. The controller provided protection path 326 is configured to protect the link between the node ROOT and the node T1.

The controller provided protection path 326 may be computed by PCE 310 and configured within the communication network 320 by the PCE 310 based on a determination by the PCE 310 that the link between the node ROOT and the node T1 is to be protected. In the communication network 320, two paths are available to protect the link between the node ROOT and the node T1 (illustratively, a first available path via the node B1 and a second available path via the node B2). Here, assume that the IGP metric of the first available path via the node B1 is lower than the IGP metric of the second available path via the node B2. If the underlying IGP was SR-capable, the IGP could calculate an LFA through the nodes ROOT, B1, and T1 in order to protect the link between the node ROOT and the node T1. Here, however, it is assumed that the IGP of communication network 320 is not SR-capable and, thus, that an LFA or TI LFA cannot be set up to protect the link between the node ROOT and the node T1. Accordingly, the PCE 310 computes the controller provided protection path 326 to protect the link between the node ROOT and the node T1. Here, since the controller provided protection path 326 is computed based on traffic engineering information, the PCE 310 can compute the controller provided protection path 326 to use the second available path via the node B2 rather than the first available path via the node B1 even though the IGP metric of the first available path via the node B1 is lower than the IGP metric of the second available path via the node B2.

The controller provided protection path 326 is configured to protect the link between the node ROOT and the node T1. The controller provided protection path 326 computed by the PCE 310 is computed from node ROOT (the source of the controller provided protection path 326) to node T1 (the destination of the link to be protected by the controller provided protection path 326). The controller provided protection path 326 computed by the PCE 310, as illustrated in FIG. 3, is the path ROOT-B2-T1 (i.e., when node ROOT detects a failure of the link to node T1, node ROOT will route packets toward node B2 such that the packets are routed via the controller provided protection path 326).

The controller provided protection path 326 is configured within the communication network 320. The controller provided protection path 326 is configured within the communication network 320 by configuring backup replication segments (BRSs) on each of the PCCs 321 of the controller provided protection path 326 (illustratively, BSR1 is configured on node ROOT, BSR2 is configured on node B2, and BSR3 is configured on node T1) and modifying the replication segment of the primary path 325 that is configured on the source of the controller provided protection path 326 to point to the controller provided protection path 326 (illustratively, modifying RS1 to point to BSR1, for failures of the link from node ROOT to node T1, at the node ROOT). The controller provided protection path 226 computed by PCE 210 may be configured on the nodes of the controller provided protection path 326 by downloading instructions to the nodes of the controller provided protection path 326.

The controller provided protection path 326 is used within the communication network 320 to protect the link from node ROOT to node T1 (i.e., the portion of the primary path 225 associated with the link from node ROOT to node T1 which, as previously indicated, is the path ROOT-T1). The controller provided protection path 326 is used within the communication network 320 to route packets around a failure of the link from node ROOT to node T1. The node ROOT, based upon detection of a failure of the link to node T1, will reroute packets from the primary path 325 to the controller provided protection path 326 such that the packets are routed along the path ROOT-B2-T1 rather than the path ROOT-T1. The routing of packets from the node ROOT to the node T1 along the controller provided protection path 326 may proceed as follows: (1) node ROOT, based on detection of failure of the link to node T1, pushes a label for node T1, pushes a label for node B2 based on the controller provided protection path 326 (i.e., the outgoing label is [T1, B2], with label [B2] being the outer label), and forwards the packet toward node B2, (2) node B2 receives the packet with the label [T1, B2], recognizes that the outer label [B2] identifies itself, swaps the outer label [B2] with a label for node T1 (i.e., the outgoing label is [T1, T1B], with label [T1B] being the outer label), and forwards the packet toward node T1, and (3) node T1 receives the packet with the label [T1, T1B] and, being a node on the primary path 325, pops the outer label [T1B], uses the bottom label [T1] to identify the RS2 forwarding information, swaps the bottom label [T1] with downstream labels of the primary path 325, and forwards the packet toward nodes T3 and T4 for delivery to nodes L1 and L2 via the primary path 325. It will be appreciated that computation and configuration of the controller provided protection path 326 enables traffic to continue to be forwarded in a traffic engineered manner which it might otherwise have been rerouted over non-preferred protection paths.

It will be appreciated that the PCE 310 and PCCs 321 may be configured to support various other functions for supporting use of controller provided protection paths within the context of multicast paths based on SR Replication P2MP Policy framework.

It will be appreciated that, within the context of the example embodiments of FIG. 2 and FIG. 3, a switch to protection path on a node may occur when there is a failure on the primary path (e.g., on the primary path egress port or interface, which may be a result of various events or conditions such as a fiber or cable cut, a router going offline because of a hardware failure or power failure, or the like) which causes the primary path to go down (e.g., in FIG. 2 when node B detects that the link or port between node B and node C is in a downstate it will switch to the protection path and in FIG. 3 when the node ROOT detects that the port between ROOT and T1 is down it would switch to protection).

Figure 4:
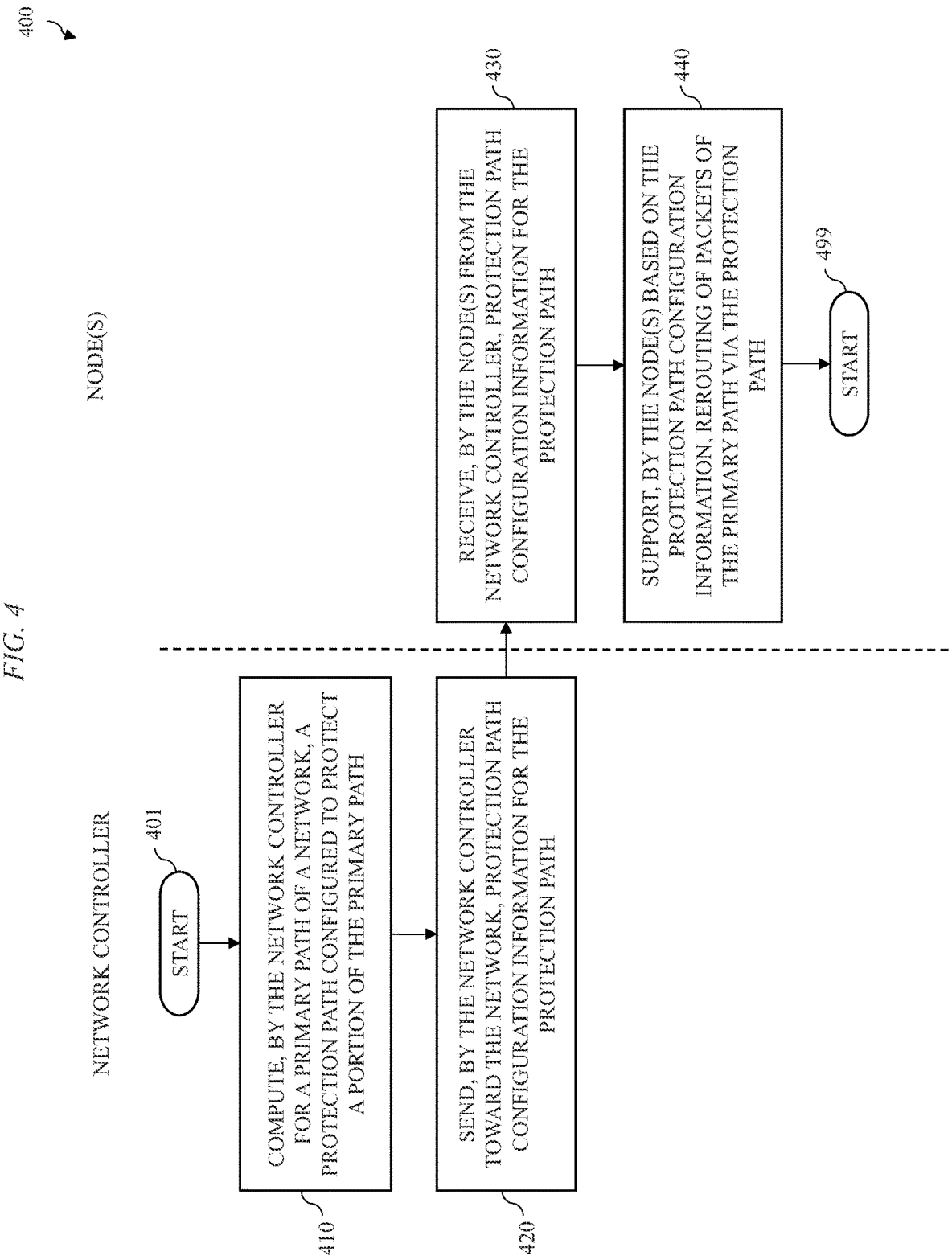
FIG. 4 depicts an example embodiment of a method for supporting controller provided protection paths in a communication network.

It will be appreciated that, although primarily presented herein with respect to use of controller provided protection paths to protect routing paths for various types of paths in various types of communication networks using various types of management capabilities, use of controller provided protection paths to protect routing paths may be used for various other types of paths, may be used in various other types of communication networks, may be used in communication networks using various other types of management capabilities, or the like, as well as various combinations thereof and, thus, that a more general description of various example embodiments is presented with respect to FIG. 4.

FIG. 4 depicts an example embodiment of a method for supporting controller provided protection paths in a communication network. It will be appreciated that a portion of the blocks of method 400 may be performed by a network controller and that a portion of the blocks of method 400 may be performed by nodes (e.g., each of one or more nodes configured by the network controller in conjunction with supporting controller provided protection paths may perform the blocks of method 400). It will be appreciated that, although primarily presented as being performed serially, at least a portion of the functions of method 400 may be performed contemporaneously or in a different order than as presented with respect to FIG. 4. At block 401, method 400 begins. At block 410, compute, by the network controller for a primary path of a network, a protection path configured to protect a portion of the primary path. At block 420, send, by the network controller toward the network, protection path configuration information for the protection path. At block 430, receive, by the node(s) from the network controller, protection path configuration information for the protection path configured to protect a portion of a primary path. At block 440, support, by the node(s) based on the protection path configuration information, rerouting of packets of the primary path via the protection path. At block 499, method 400 ends. It will be appreciated that various packet routing support functions presented herein with respect to FIGS. 1-3 may be incorporated within the context of method 400 of FIG. 4.

Various example embodiments for supporting controller provided protection paths in a communication network may provide various advantages or potential advantages. For example, various example embodiments for supporting controller provided protection paths in a communication network may be configured to enable nodes to request computation of protection paths by the network controller, may be configured to enable the network controller to push protection information to nodes, may be configured to enable nodes to support FRR operations based on protection paths provided (e.g., computed and configured) by the network controller, or the like, as well as various combinations thereof. For example, various example embodiments for supporting controller provided protection paths in a communication network may obviate the need for use of bypass protection mechanisms that do not take into account traffic engineering information and, thus, which merely provide shortest path, best effort protection paths. For example, various example embodiments for supporting controller provided protection paths in a communication network may obviate the need for use of IGP LFA or TI LFA to compute protection paths in a communication network. Various example embodiments for supporting controller provided protection paths in a communication network may provide various other advantages or potential advantages.

Figure 5:
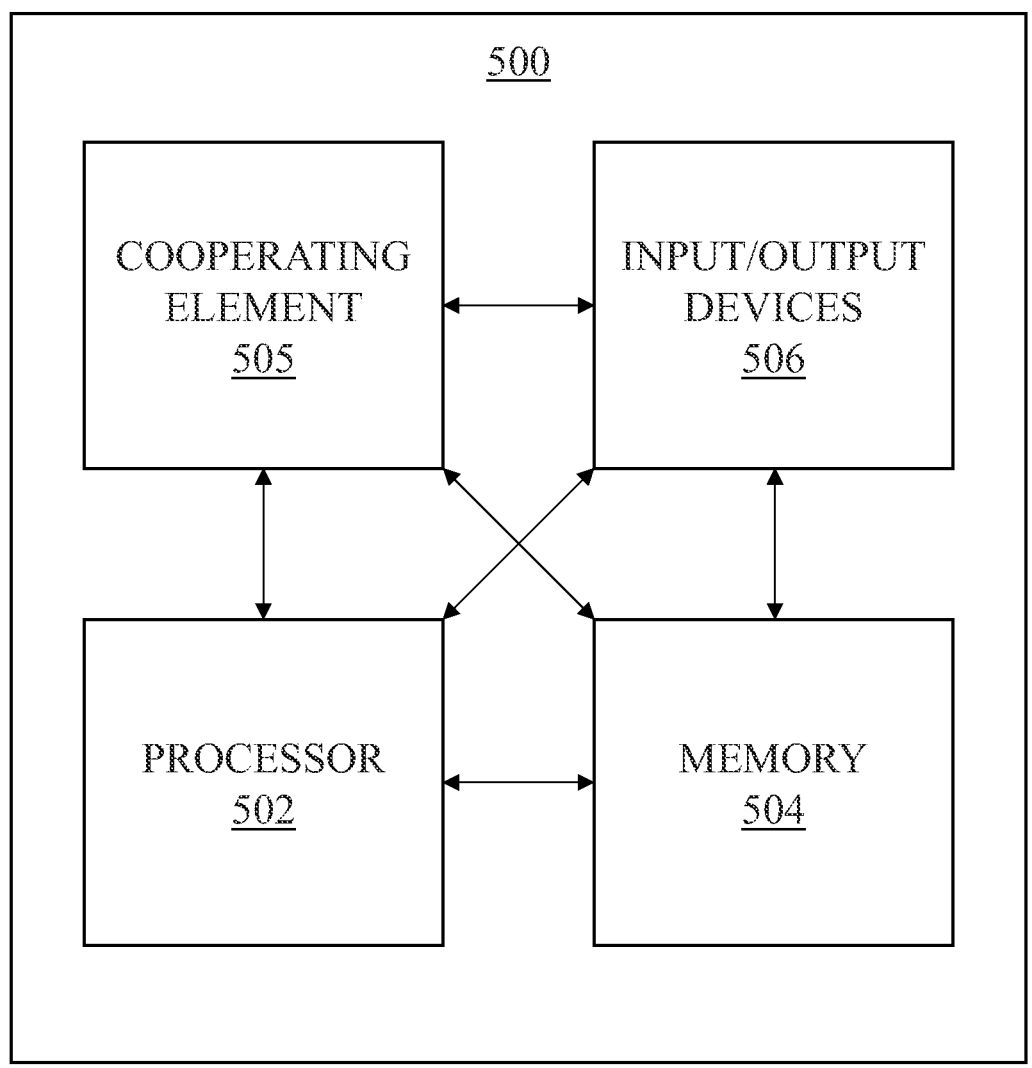
FIG. 5 depicts an example embodiment of a computer suitable for use in performing various functions presented herein.

FIG. 5 depicts an example embodiment of a computer suitable for use in performing various functions presented herein.

The computer 500 includes a processor 502 (e.g., a central processing unit (CPU), a processor, a processor having a set of processor cores, a processor core of a processor, or the like) and a memory 504 (e.g., a random access memory, a read only memory, or the like). The processor 502 and the memory 504 may be communicatively connected. In at least some example embodiments, the computer 500 may include at least one processor and at least one memory including computer program code, wherein the at least one memory and the computer program code are configured to, with the at least one processor, cause the computer to perform various functions presented herein.

The computer 500 also may include a cooperating element 505. The cooperating element 505 may be a hardware device. The cooperating element 505 may be a process that can be loaded into the memory 504 and executed by the processor 502 to implement various functions presented herein (in which case, for example, the cooperating element 505 (including associated data structures) can be stored on a non-transitory computer-readable storage medium, such as a storage device or other suitable type of storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 may represent a general architecture and functionality suitable for implementing functional elements described herein, portions of functional elements described herein, or the like, as well as various combinations thereof. For example, computer 500 may provide a general architecture and functionality that is suitable for implementing one or more elements presented herein, such as network controller 110, a node 121, a PCE 210, a PCC 221, a PCE 310, a PCC 321, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative"). It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions that, when executed by the at least one processor, cause the apparatus to at least:
   determine, by a network controller for a primary path including a first node and a second node that is upstream of the first node on the primary path, an identifier that represents a portion of the primary path rooted at the first node;
   compute, by the network controller based on a determination that the second node is unable to use the identifier to identify a set of hops of which the portion of the primary path is composed, a protection path rooted at the second node and configured to protect the portion of the primary path; and
   send, by the network controller toward the second node, protection path configuration information for the protection path.

2. The apparatus of claim 1, wherein the primary path comprises a unicast path based on segment routing.

3. The apparatus of claim 1, wherein the determination that the second node is unable to use the identifier to identify the set of hops of which the portion of the primary path is composed is based on a determination that the first node is able to use the identifier to identify the set of hops of which the portion of the primary path is composed and a determination that the second node is upstream of the first node on the primary path.

4. The apparatus of claim 1, wherein the protection path configuration information comprises a mapping of the identifier that represents the portion of the primary path to a set of hops of which the protection path is composed.

5. The apparatus of claim 1, wherein the protection path configuration information comprises a description of the protection path.

6. The apparatus of claim 1, wherein the identifier that represents the portion of the primary path comprises a Binding Segment Identifier (BSID).

7. An apparatus, comprising:
   at least one processor; and
   at least one memory including instructions that, when executed by the at least one processor, cause the apparatus to at least:
   receive, by a node from a network controller, protection path configuration information for a protection path configured to protect a portion of a primary path, wherein the protection path configuration information comprises a mapping of an identifier that represents the portion of the primary path to a set of hops of which the protection path is composed;
   receive, by the node, a packet including an identifier of a second node and the identifier that represents the portion of the primary path;
   modify, by the node based on a determination that the second node is not reachable, the packet to form a modified packet, wherein the packet is modified to form the modified packet by removing the identifier that represents the portion of the primary path and inserting the set of hops of which the protection path is composed; and
   send, by the node via the protection path, the modified packet.

8. The apparatus of claim 7, wherein the primary path comprises a unicast path based on segment routing.

9. The apparatus of claim 7, wherein the second node is unable to use the identifier that represents the portion of the primary path to identify a set of hops of which the portion of the primary path is composed.

10. The apparatus of claim 7, wherein the identifier that represents the portion of the primary path comprises a Binding Segment Identifier (BSID).

11. A method, comprising:
    receiving, by a node from a network controller, protection path configuration information for a protection path configured to protect a portion of a primary path, wherein the protection path configuration information comprises a mapping of an identifier that represents the portion of the primary path to a set of hops of which the protection path is composed;

receiving, by the node, a packet including an identifier of a second node and the identifier that represents the portion of the primary path;

modifying, by the node based on a determination that the second node is not reachable, the packet to form a modified packet, wherein the packet is modified to form the modified packet by removing the identifier that represents the portion of the primary path and inserting the set of hops of which the protection path is composed; and sending, by the node via the protection path, the modified packet.

12. A method, comprising:

determining, by a network controller for a primary path including a first node and a second node that is upstream of the first node on the primary path, an identifier that represents a portion of the primary path rooted at the first node;

computing, by the network controller based on a determination that the second node is unable to use the identifier to identify a set of hops of which the portion of the primary path is composed, a protection path rooted at the second node and configured to protect the portion of the primary path; and sending, by the network controller toward the second node, protection path configuration information for the protection path.

13. The apparatus of claim 1, wherein the network controller comprises a path computation element (PCE), wherein the protection path configuration information for the protection path is sent toward a path computation client (PCC).

14. The apparatus of claim 7, wherein the node comprises a path computation client (PCC) and the network controller comprises a path computation element (PCE).

15. The method of claim 11, wherein the node comprises a path computation client (PCC) and the network controller comprises a path computation element (PCE).

16. The method of claim 12, wherein the network controller comprises a path computation element (PCE), wherein the protection path configuration information for the protection path is sent toward a path computation client (PCC).

* * * * *